United States Patent Office 3,213,888
Patented Oct. 26, 1965

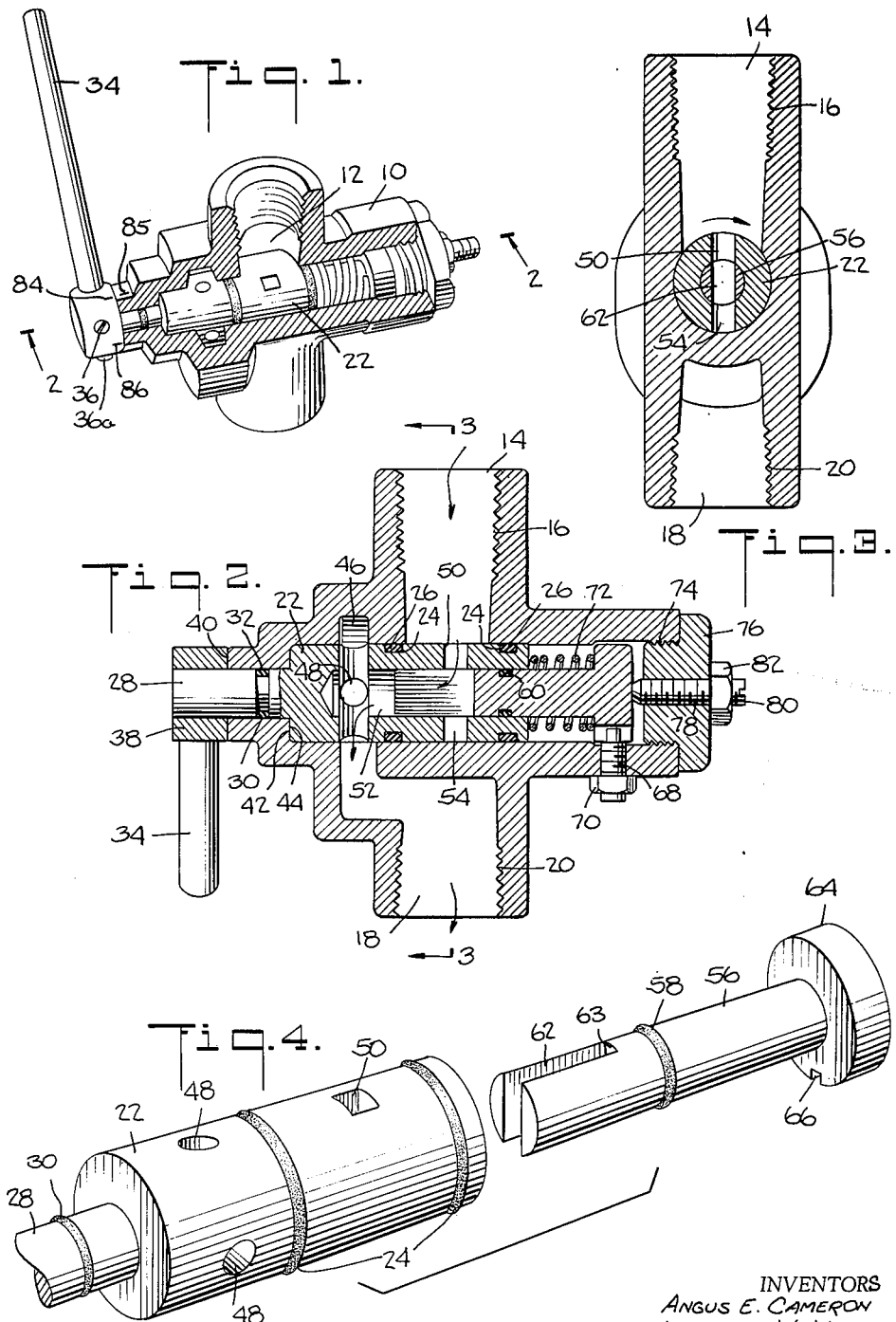

3,213,888
HYDRAULIC METERING VALVES
Angus E. Cameron, New Milford, and Llewellin W. Wade, Stamford, Conn., assignors to Preferred Utilities Manufacturing Corporation, Danbury, Conn., a corporation of Connecticut
Filed Apr. 1, 1963, Ser. No. 269,543
1 Claim. (Cl. 137—637.4)

This invention relates to valves and more particularly to hydraulic metering valves. Valves embodying the invention find a wide variety of applications throughout industry. Among its varied uses, it is particularly adaptable for use in the fuel oil inlet line of oil burner installations.

Prior art valves generally provided metered flow that had an exponential characteristic. That is, the flow rate corresponding to the percentage of valve opening produced a curve, generally hyperbolic in shape. Since it is desirable in most applications to have a straight line flow characteristic, prior art devices employed complicated linkage systems to achieve the desired results. Therefore, one of the objects of the present invention is to provide a valve having the desired straight-line flow characteristic without the use of such linkage.

Further, prior art devices were prone to clogging by such foreign elements as paraffin, tars or dirt which are prevalent in today's fuel oils. Such clogging resulted in irregular and undependable operation of the oil burning apparatus. One of the features of the instant valve is to eliminate such undesirable operation or to reduce same to insignificance.

The invention in still a further aspect thereof comprises the provision of a metering valve which is simple, economical and adaptable for modern mass production manufacturing techniques. Moreover, the valve may be manufactured to cover a wide range of operating capacities and, therefore, reduce the manufacturer's or distributor's stocking problem.

It is well known to those skilled in the art that leakage creates a major problem during normal valve operation. With applicant's valve, leakage is minimized through the use of well known "O" ring seals. Thus, adjustment or take-up of the packing is not required. This is particularly important when the valve is initially placed in service or after a long period of idleness, such as occurs during the summer period on a normal heating installation.

The invention in a still further aspect thereof comprises the provision of dual control. Thus, vernier-like adjustment is possible. The first control or adjusting means provides adjustment of the rate of oil flow over the entire range of operation. The second control or adjustment means adjusts the valve from the full open to the full closed position. Thus, the first adjusting means affects the flow rate over the entire operating range as compared to the second control means which opens and closes the valve. Preferably the first control is manually set and remains in position for a period of time. For example, a correction for a change in the rate of oil flow to the burner due to the change in the viscosity of the oil can be effected. Since the two adjusting means are independent one from the other, the first adjusting means may be changed without disturbing the link motion that coordinates the oil and air flow of the second adjusting means. Preferably the second adjusting means is remotely controlled and operates in conjunction with the air flow to the oil burner, for example. It is to be noted that a relatively small movement of the second adjusting means moves the valve from the full open position to the full closed position.

As a further aspect of our invention, adjustment of either or both of the adjusting means can be effected without disturbing the pipe line connections. This is important particularly when large sized piping components are employed. It is also important for older installations after the pipe joints have corroded or "frozen."

The invention in still a further aspect thereof provides extremely high precision and micrometer accuracy without the necessity of employing extremely close tolerances in the fabrication thereof. Thus, the high cost of machinery usually attendant with precision valves is eliminated.

Moreover, as a still further feature thereof, the second adjusting means may be locked in a pre-selected position so that vibration or other extraneous factors will not alter its position during normal operation of the valve.

Additionally, it has been found that our valve is adaptable for visual indication of the degree of opening thereof. That is, the degree of opening of the valve may be readily ascertained by visual observation by the operator thereof.

In order to achieve the aforementioned features and objects, our invention contemplates the provision of a metering valve comprising a valve body having a cavity therein. A rotatable shaft is positioned within such cavity and is provided with an opening therein. Means are provided for adjusting the width of such opening and means are also provided for adjusting the length thereof. There is an inlet means communicating with one side of the opening and there is an outlet means in the body communicating with the other side of the opening. Thus, the passage of fluid through the valve is maintained at pre-selected values by two separate adjusting means.

There has thus been outlined rather broadly the most important features of the present invention in order that the detailed description thereof that follows may be better understood and in order that the present contribution to the art may be better appreciated. There are, of course, additional features of the invention that will be described hereafter and which will form the subject of claim appended hereto. Those skilled in the art will appreciate that the conception on which the present disclosure is based may readily be utilized as a basis for designing other structures for carrying out the several purposes of this invention. It is important, therefore, that the claim be regarded as including such equivalent constructions as do not depart from the concept and scope of this invention.

A specific embodiment of the invention has been chosen for purposes of illustration and description and is shown in the accompanying drawings, forming a part of the specification, wherein:

FIG. 1 is a perspective view partially broken away to reveal the internal construction of a valve constructed in accordance with our invention;

FIG. 2 is a sectional view taken along line 2—2 of FIG. 1;

FIG. 3 is a sectional view taken along line 3—3 of FIG. 2; and

FIG. 4 is an exploded view showing the rotatable shaft and slotted metering cylinder.

Referring now to the drawings in more detail FIGS. 1 and 2 show a valve body 10 having a cavity 12 cast therein. An inlet 14 is provided which is illustrated as having a female pipe thread 16 therein. However, a standard flange connection may be employed, if desired, without departing from the the concept of this invention. Oppositely disposed from the inlet passage 14 is an outlet passage 18 which is illustrated in FIG. 2. The outlet passage 18 is provided with a female pipe thread 20, however, a standard pipe flange may be employed in lieu of the pipe thread tapping, if desired. As is well known to those skilled in the art, the selection of screwed fittings or flange fittings depends upon the nature of the installation and the pressures and temperatures involved. The inlet and outlet fittings are indicated as being cast integrally with the valve body for production purposes, however, such fittings may be cast separately and bolted to the main valve body, if desired. The valve body may be manufactured from cast iron, steel, bronze or the like as desired. For particular installations plastics or high temperature stainless steel or high temperature alloys may be employed depending upon the operating temperatures and pressures to which the particular valve will be subjected. The valve body cavity 12 may be cast therein or bored out by means of ordinary machinery. Preferably, a combination of casting and machining processes are employed. The cavity of the valve body is sized to receive the rotatable shaft 22 as illustrated in FIG. 4, and such shaft is freely rotatable therein. Annular grooves or slots 24 are provided in the shaft 22 in order to receive O rings 26 which seal various chambers of the valve body cavity one from the other. Such O rings provide an effective sealing means and are readily commercially available, however, other types of seals such as ring packing may be employed, if desired, if they do not unduly restrict the rotational movement of the rotatable shaft 22. One end of the rotatable shaft 22 is provided with a portion of reduced diameter 28, in which is positioned an annular groove or slot 30 for purposes of receiving an O ring 32. Thus, an effective seal is provided between said shaft and the valve body 10 as shown in FIG. 2. A positioning arm 34 is connected to the extremity of the rotatable shaft 22 by means of a dog point set screw 36, the extremity of the shaft 22 being counterbored to receive the set screw 36. The location of the counterbore is in an exact relation to the metering inlet 50, in rotatable shaft 22. An additional serrated or cup seat set screw 36a is inserted in the arm 34, to further lock this arm 34, to the shaft 22. However, other means such as splining or keying the positioning arm to the rotatable shaft 22 may be employed, if desired. The positioning arm 34 is provided with a hub portion 38 which bears against shoulder 40 of the valve body 10 in order to prevent excessive axial movement thereof to the right as seen in FIG. 2. A shoulder 42 on the valve body 10 coacts with shoulder 44 of the rotatable shaft 22 in order to prevent excessive axial movement to the left as seen in FIG. 2.

The valve body 10 is provided with an annular channel or groove 46 which communicates with the outlet passage 18. Further, the annular groove 46 is in axial alignment with a series of radially extending apertures 48 contained in the rotatable shaft 22.

The rotatable shaft 22 is provided with a metering inlet 50 which communicates with the inlet passage 14 of the valve body 10. The metering inlet 50 is an aperture or opening preferably conforming to a square or rectangular configuration and extending inwardly to cavity or boring 52 within the rotatable shaft 22. The rotating shaft 22 may also be provided with a metering inlet 54 positioned diametrically opposite the metering inlet 50. Such a second metering inlet is provided for the purpose of allowing communication between the internal cavity 52 of the rotating shaft 22 through either metering inlet 50 or 54 so that the rotating shaft 22 will be in operative position when either metering inlet is in communication with the inlet passage 14. Further, an annular groove may be provided in the valve body 10 in order to provide communication between the inlet passage 14 and both metering inlets 50 and 54 simultaneously, thus allowing for the passage of greater quantities of fluid therethrough. Moreover, the second metering inlet may be provided in order to facilitate the machining operation of the first metering inlet.

The cavity 52 contained within the rotatable shaft 22 is an axial bore which extends from one end of the rotatable shaft 22 to a position adjacent the radial apertures 48 and provides communication therewith. The internal cavity or bore 52 receives a slotted metering cylinder 56. The slotted metering cylinder 56 and the rotating shaft 22 coact in such a manner as to allow the cylinder to remain stationary while the rotatable shaft is rotated thereabout. The slotted metering cylinder 56 contains an annular groove 58 provided for the purpose of receiving an O ring 60 for sealing purposes. One end of the slotted metering cylinder 56 is provided with an elongated slot 62, which extends axially of the cylinder as shown in FIG. 4. The length of the slot 62 is such that when the cylinder is positioned within the rotating shaft 22 in its operative position one end of the slot registers with the metering inlets 50 and 54. The opposite end of the slotted metering cylinder 56 is provided with a head 64 of increased diameter. Said head is provided with a longitudinally extending slot 66 which receives a dog-point screw 68. The screw threadedly engages valve body 10 and the end thereof is adapted to fit within the slot 66 in order to prevent rotational movement of the slotted metering cylinder 56. However, such cylinder is free to move axially for a purpose which will be described hereinafter. The dog-point screw 68 is provided with a lock nut 70 as shown in FIG. 2.

The head 64 on the slotted metering cylinder 56 is adapted to provide a shoulder for a compression spring 72. The other end of the compression spring 72 rests against the end edge of the rotatable shaft 22 which acts as a shoulder therefor. Thus, the cylinder 56 is urged outwardly by the spring member. The adjacent end of the valve body 10 is provided with internal threads 74 in order to receive a cap nut 76. Such cap nut is provided with a threaded internal bore for receiving an Allen type adjusting screw 78 for axially urging the slotted metering cylinder 56 inwardly, opposed to the aforementioned action of the compression spring 72. The Allen adjusting screw 78 is provided with a socket end portion 80 for purposes of readily adjusting the axial position of same as desired. A lock nut 82 locks the adjusting screw in its preselected position so that movement thereof will not occur due to outside vibrational forces.

In operation the fluid enters the valve body through the inlet passage 14 and passes towards the metering inlet 50 in a radial direction. After passing radially inwardly through the metering slot 50 or 54 as the case may be, the fluid enters the metering slot 62 in the metering cylinder 56. Thence the fluid passes axially towards the left as shown by the arrows in FIG. 2, from whence the fluid passes through the cavity 52 in the rotating shaft 22 to the apertures 48 contained therein. Then the fluid flows radially outwardly through the apertures 48 into the annular groove 46 in the valve body 10, to the outlet passage 18.

The valve in accordance with this invention is provided with dual control means. That is, a first control adjusting means provides adjustment of the rate of oil flow over the entire range of operation of the valve. Such adjustment is obtained by means of axially positioning the metering slot 62 relative to the metering inlet 50. The terminal portion 63 of the slot overlays the metering inlet 50 by various adjustable amounts and accordingly blocks the passage and throttles the flow of fluid therethrough. The metering cylinder 56 is urged axially against the Allen adjusting screw 78 by means of the compression spring 72 acting against the head 64 of the metering cylinder 56. Therefore, axial adjustment of the cylinder is obtained by positioning the adjusting screw 78. Generally this control or adjustment of the valve is manually set in position and remains there for a period of time. For example, it is utilized to compensate for a change in the rate of oil flow to an oil burner due to the change of viscosity of the oil being supplied as when a new tankful of oil has been delivered. It is to be pointed out that such control or adjusting means provides adjustment of the rate of flow of the oil over the entire operating range of the valve.

The second control or adjustment means adjusts the valve from the full open to the full closed position. This is accomplished by means of rotating the positioning arm 34 which in turn rotates the rotating shaft 22 while the value body 10 and the metering cylinder 56 remain stationary. Thus, the metering orifice 50 registers with the metering slot 62 in proportion to the degree of rotational movement of the positioning arm 34. That is, as the rotatable shaft 22 rotates, the metering cylinder 56 partially covers or blocks the metering orifice 50 so that the flow therethrough is gradually throttled from the full open to the full closed position. A movement of the order of 57° of the arm 34 moves the valve from full open to full closed position or vice versa. Suitable markings may be provided on the hub portion 38 of the arm 34 to indicate the open and closed position of the valve, i.e., the relative radial position of metering orifice 50 in respect to metering slot 62. Thus, mark 84 on hub portion 38 is stamped "C" and when it lines up with mark 85, on valve body 10, the valve is in the closed position. When mark 86, stamped "O," on hub portion 38, lines up with mark 85 on valve body 10, the valve is in the open position. As will be observed, the valve is capable of rapidly moving from the open to the closed position due to the very small movement thereof. If desired, linear markings may be imprinted on the hub portion 38 of the positioning arm 34 in order for the operator to visually observe the extent of the opening of the valve at any given time. Generally, the positioning arm 34 is connected through a linkage system (not shown) and thereby is remotely controlled so that its operation is co-ordinated in conjunction with the air flow to the oil burner, for example. It is to be noted that either or both of the adjusting means can be effected without disturbing the pipe line connections. Moreover, each control means may be individually adjusted without effecting or disturbing the setting of the other control means.

Although certain particular embodiments of the invention are herein disclosed for purposes of explanation, further modifications thereof, after study of this specification, will be apparent to those skilled in the art to which the invention pertains. Reference should accordingly be had to the appended claim in determining the scope of the invention.

What is claimed and desired to be secured by Letters Patent is:

A metering valve comprising a valve body having a cavity therein, said body being provided with an inlet passage and an outlet passage, a rotatable shaft positioned partially within said cavity, means for rotating said shaft, said shaft having an axially extending bore therein, said shaft being provided with a metering inlet positioned adjacent and fed from said inlet passage and a plurality of radially directed apertures feeding into said outlet passage and fed from said bore, said rotatable shaft being provided with a second metering inlet disposed diametrically opposite said metering inlet and adapted to be positioned adjacent and fed from said inlet passage when said rotatable shaft is rotated, a metering cylinder positioned partially within said bore, one end of said cylinder being provided with an elongated slot which is fed from said metering inlet and feeds into said bore, a cap nut for closing the end portion of said cavity, an adjusting screw carried by said cap nut for axially positioning said cylinder, spring means interposed between said rotating shaft and said cylinder for urging said cylinder against said adjusting screw, means for retaining said cylinder from rotational movement, said cylinder being adapted to progressively overlie said metering inlet in response to such axial position thereof, and said cylinder being adapted to progressively overlie said metering inlet in response to the angular position of said rotatable shaft, and fluid sealing means being disposed on each side of said metering inlet between said rotatable shaft and said valve body.

References Cited by the Examiner

UNITED STATES PATENTS

| 731,271 | 6/03 | Booz | 137—614.17 |
| 1,362,538 | 12/20 | Matlock | 137—637.4 XR |
| 1,479,802 | 1/24 | Glendenning | 137—614.16 |
| 2,237,784 | 4/41 | Iler | 137—614.16 |
| 2,433,732 | 12/47 | Brown | 251—309 X |
| 2,708,096 | 5/55 | Mueller | 251—309 |

FOREIGN PATENTS

| 929,407 | 6/55 | Germany. |
| 780,191 | 7/57 | Great Britain. |

WILLIAM F. O'DEA, *Primary Examiner.*